(12) United States Patent
Gan et al.

(10) Patent No.: US 12,542,616 B2
(45) Date of Patent: Feb. 3, 2026

(54) SYSTEMS AND METHODS FOR DETECTING RELOCATION OF A FIXED WIRELESS ACCESS DEVICE

(71) Applicant: Verizon Patent and Licensing Inc., Basking Ridge, NJ (US)

(72) Inventors: Seng Gan, Ashburn, VA (US); Andrew Patka, Holliston, MA (US); Michael D. Hanson, Millington, NJ (US); Arun Cherla, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 363 days.

(21) Appl. No.: 18/296,369

(22) Filed: Apr. 5, 2023

(65) Prior Publication Data

US 2024/0340096 A1   Oct. 10, 2024

(51) Int. Cl.
*H04B 17/318* (2015.01)
*H04W 24/08* (2009.01)
*H04W 64/00* (2009.01)

(52) U.S. Cl.
CPC .......... *H04B 17/318* (2015.01); *H04W 24/08* (2013.01); *H04W 64/00* (2013.01)

(58) Field of Classification Search
CPC .... H04B 17/318; H04W 24/08; H04W 64/00; H04W 24/02; H04W 64/003
See application file for complete search history.

(56) References Cited

U.S. PATENT DOCUMENTS

| | | | | |
|---|---|---|---|---|
| 2013/0237246 A1* | 9/2013 | Aggarwal | ............ | G01S 13/765 455/456.1 |
| 2016/0080921 A1* | 3/2016 | Yadav | .................. | H04W 4/023 455/456.2 |
| 2019/0219678 A1* | 7/2019 | Miyazawa | .............. | E05B 49/00 |
| 2020/0162890 A1* | 5/2020 | Spencer | .................. | H04L 43/10 |
| 2020/0169339 A1* | 5/2020 | Patel | ..................... | H04W 16/20 |
| 2021/0410014 A1* | 12/2021 | Yoon | ..................... | H04W 16/10 |
| 2023/0388897 A1* | 11/2023 | Polaganga | ............ | H04W 28/20 |

FOREIGN PATENT DOCUMENTS

| | | | | |
|---|---|---|---|---|
| CN | 112312405 A | * | 2/2021 | ............ H04W 16/18 |
| KR | 20130037349 | * | 4/2013 | |
| WO | WO-2020097852 A1 | * | 5/2020 | |

* cited by examiner

*Primary Examiner* — Michael A Keller

(57) ABSTRACT

A network management system may determine a first change in a first signal strength associated with first signals received by a fixed wireless access device located a first location. The first signals are received by the fixed wireless access device from a first base station. The network management system may determine a second change in a second signal strength associated with second signals received by the fixed wireless access device. The second signals are received by the fixed wireless access device from a second base station. The network management system may determine that the fixed wireless access device has been relocated to a second location based on the first signal strength increasing by at least a first attenuation value and the second signal strength decreasing by at least a second attenuation value.

20 Claims, 10 Drawing Sheets

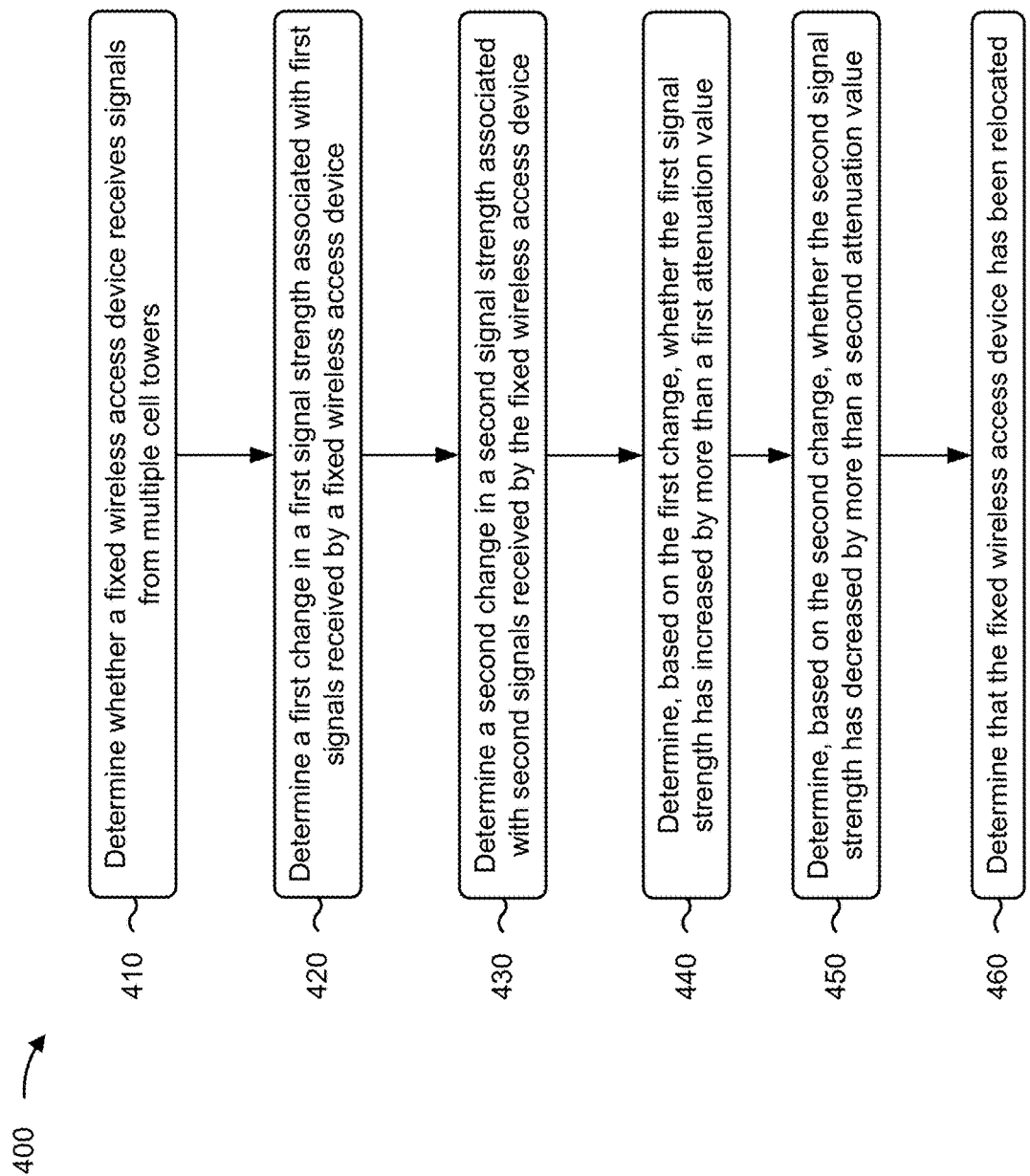

SYSTEMS AND METHODS FOR DETECTING RELOCATION OF A FIXED WIRELESS ACCESS DEVICE

BACKGROUND

A base station (e.g., an eNodeB and/or a gNodeB, among other examples) is a hardware component that connects a core network to an end user mobile device (e.g., a user equipment (UE)). In some situations, the base station may establish a connection with a fixed wireless access device to provide Internet access to user devices connected to the fixed wireless access device.

BRIEF DESCRIPTION OF THE DRAWINGS

FIG. 4 is a flowchart of an example process relating to detecting a relocation of a fixed wireless access device.

DETAILED DESCRIPTION OF PREFERRED EMBODIMENTS

Figure 1A:
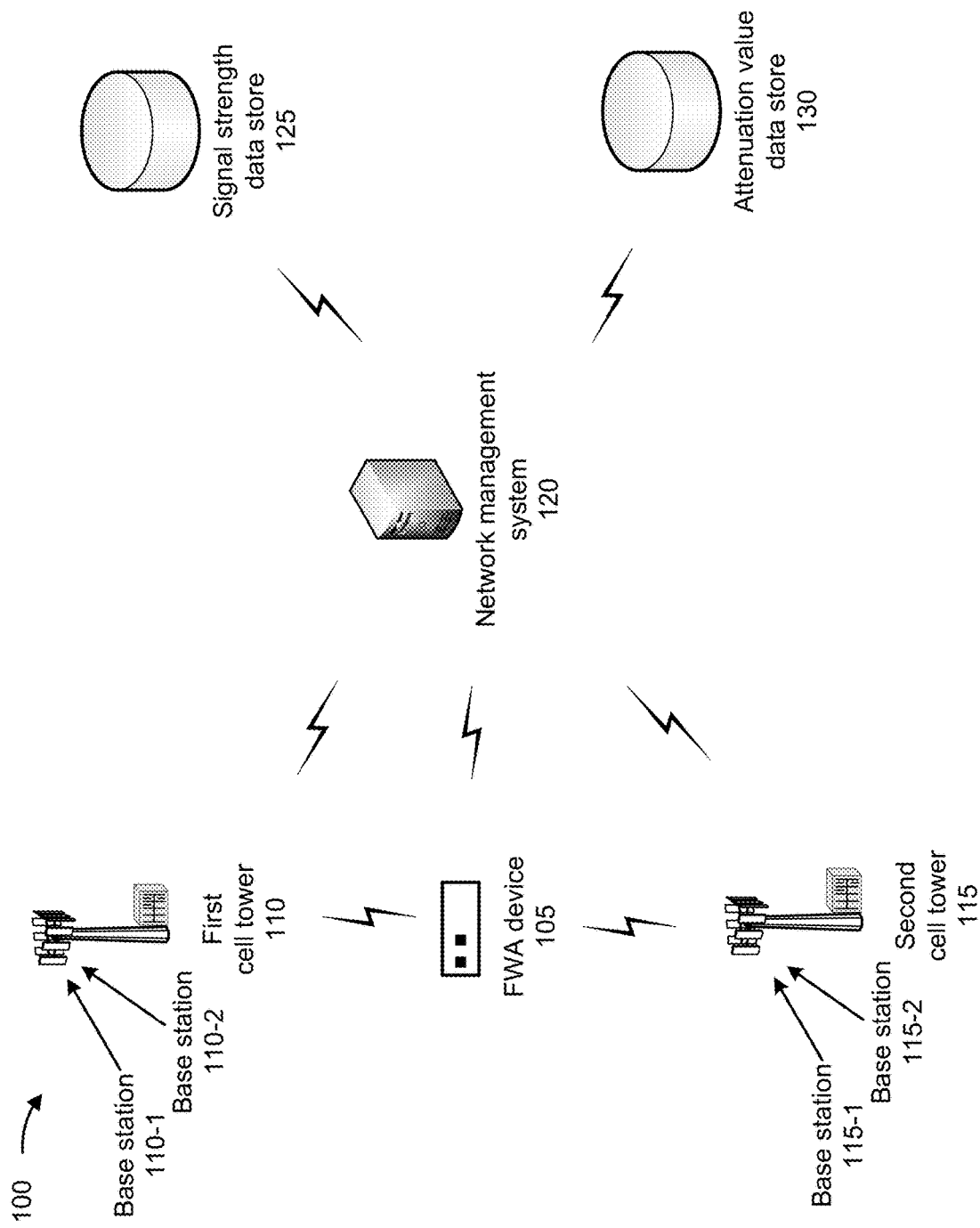
FIGS. 1A-1G are diagrams of an example associated with detecting a relocation of a fixed wireless access device.

The following detailed description of example implementations refers to the accompanying drawings. The same reference numbers in different drawings may identify the same or similar elements.

A base station may operate in accordance with a fifth generation (5G) standalone architecture (SA). The base station may include a gNodeB (or gNB) and may hereinafter be referred to as "5G base station." Alternatively, the base station may operate in accordance with fourth generation (4G) long term evolution (LTE). The base station may include an eNodeB (or eNB) and may hereinafter be referred to as "4G base station."

In a 5G non-standalone architecture (NSA), a fixed wireless access (FWA) device may establish a connection with the base station. The FWA device may be provided on a customer premises. The FWA device may establish the connection with the base station to enable the base station to provide Internet access to the FWA device (e.g., based on an Internet service subscription associated with the FWA device).

In some instances, the performance of the FWA device may be degraded. For example, a quality of the connection may be degraded, which may cause a speed of the Internet service to be degraded. Accordingly, a customer (associated with the FWA device) may provide a notification to a service provider that owns the FWA device. The notification may indicate that the speed of the Internet service has been degraded. As a result, personnel of the service provider may use one or more computing devices to troubleshoot the connection and/or the FWA device to determine possible reasons of the degraded performance.

The degraded performance may be caused by different reasons, including unfavorable weather conditions. The one or more computing devices may be used to troubleshoot the connection and/or the FWA device to determine whether each of the different reasons has occurred. Troubleshooting the connection in this manner is a time-consuming process. Accordingly, troubleshooting the connection may excessively consume network resources and/or computing resources, among other resources. In some examples, as a result of troubleshooting the connection, the FWA device may attempt to reboot and/or to perform a re-configuration multiple times. Rebooting and/or performing the re-configuration in this manner may excessively consume network resources and/or computing resources, among other resources.

Implementations described herein are directed to determining a cause of a performance of an FWA device being degraded (e.g., to determine a cause of a degradation of a quality of a connection established by the FWA device). For example, as part of troubleshooting the connection, a network management system may detect whether the FWA device has been moved significantly enough to degrade the performance of the FWA device.

In some implementations, the network management system may obtain signal strength information from the FWA device. The signal strength information relates to the strength of the signals transmitted from one or more base stations received by the FWA device. Based on the signal strength information, the network management system may determine that the signals were received from multiple base stations of different cell towers. The signal strengths may be measured, over multiple periods of time, by the FWA device and/or by the multiple base stations (e.g., a first base station of a first cell tower and a second base station of a second cell tower). The signal strength information may be obtained from a data store.

In some implementations, the network management system may analyze the signal strengths to determine changes to the signal strengths over different periods of time. For example, the network management system may determine whether a first signal strength, of signals received from the first cell tower, has increased by a value that exceeds a first attenuation value. Additionally, the network management system may determine whether a second signal strength, of signals received from the second cell tower, has decreased by a value that exceeds a second attenuation value.

An attenuation value may refer to a value by which a signal strength is increased or decreased due an obstructing structure (e.g., a wall). In some implementations, the attenuation value may be associated with a frequency band of a signal. For example, the attenuation value may indicate a measure of signal attenuation caused by the obstructing structure to signals of the frequency band. In some examples, personnel of a service provider (associated with the FWA device) may determine the attenuation value. For example, during installation of the FWA device, the personnel may measure a value by which the signal strength of the signal of the frequency band is increased or decreased by the obstructing structure. Due to standard building code in a particular country/region, a standard estimated attenuation value for each frequency can be used in the event no actual measurement is available.

In some implementations, by determining that the first signal strength has increased by a value that exceeds the first attenuation value and determine that the second signal strength has decreased by a value that exceeds the second attenuation value, the network management system may determine that the FWA device has been relocated from a current location to a different location, e.g., a different room on customer premises. In this regard, the network management system may determine that the FWA device being relocated is a cause of the performance of the FWA device being degraded.

In contrast to the example provided above with respect to the first attenuation value and the second attenuation value, unfavorable weather conditions cause the first signal strength and the second signal strength to be decreased at similar level. In other words, typically, unfavorable weather conditions cause the first signal strength and the second signal strength to be decreased by a same value. Accordingly, implementations described herein may distinguish between the performance of the FWA device being degraded due to the FWA device being relocated and the performance of the FWA device being degraded due to unfavorable weather conditions (e.g., rain, snow, among other examples of weather conditions that affect signal propagation). By determining that the FWA device being relocated is a cause of the degraded performance, the network management system may prevent time-consuming troubleshooting, as described above. Accordingly, by determining that the FWA device being relocated is the cause of the degraded performance, the network management system may prevent the FWA device from rebooting and/or performing the re-configuration, as described above. Therefore, implementations described herein preserve network resources and/or computing resources that would have been consumed by troubleshooting the connection, as described above.

FIGS. 1A-1G are diagrams of an example 100 associated with detecting a relocation of a fixed wireless access device. As shown in FIGS. 1A-1G, example 100 includes an FWA device 105, a first base station 110, a second base station 115, a network management system 120, a signal strength data store 125, and an attenuation value data store 130.

FWA device 105 may include a communication device and a computing device. For example, FWA device 105 may include a customer premises equipment (CPE), an antenna, a transceiver, and/or a router, among other examples. FWA device 105 may be configured to establish a connection with a base station to provide Internet access to mobile devices connected to FWA device 105. The mobile devices may include a mobile phone, a user equipment, a laptop computer, a tablet computer, and/or a desktop computer, among other examples.

First cell tower 110 may include a plurality of base stations (e.g., a base station 110-1, a base station 110-2, and so on). In some examples, base station 110-1 (hereinafter referred to "first base station 110-1") may include an eNodeB. Alternatively, first base station 110-1 may include a gNodeB. In some situations, first base station 110-1 may be associated with multiple sectors corresponding to respective antennas, of first base station 110-1, that are facing in respective directions.

In some examples, first base station 110-1 may maintain an anchoring relationship with respect to other base stations. In other words, first base station 110-1 may be configured to cause an additional base station to establish a connection with FWA device 105. The additional base station may establish the connection in order for the additional base station to act as a secondary source (or a secondary node) with respect to the provisioning of Internet access to FWA device 105. In some examples, the additional base station may be a base station of first cell tower 110 or a base station of second cell tower 115.

Second cell tower 115 may include a plurality of base stations (e.g., a base station 115-1, a base station 115-2, and so on). In some examples, base station 115-1 (hereinafter referred to "second base station 115-1") may be similar to first base station 110-1. Second base station 115-1 may include an eNodeB. Alternatively, second base station 115-1 may include a gNodeB. Second base station 115-1 may be associated with multiple sectors corresponding to respective antennas, of second base station 115-1, that are facing in respective directions. In some examples, second base station 115-1 may maintain an anchoring relationship with respect to other base stations.

Network management system 120 may include one or more devices configured to detect a relocation of FWA device 105. For example, network management system 120 may analyze signal strengths of signals received by FWA device 105 from multiple base stations of first cell tower 110 and of second cell tower 115 (e.g., from first base station 110-1 and from second base station 115-1). Network management system 120 may analyze the signal strengths to determine changes to the signal strengths over a period of time. Based on the changes, network management system 120 may determine that FWA device 105 has been relocated, as explained in more detail below.

Network management system 120 may include a network management system associated with eNodeBs. Additionally, or alternatively, network management system 120 may include a network management system associated with gNodeBs. Additionally, or alternatively, network management system 120 may include a network management system associated with FWA devices.

Signal strength data store 125 may include a database or the like in a data structure, e.g., a table, and/or a linked list or the like, that stores signal strength information regarding values of signal strengths of signals received by FWA device 105. The signals may be received from first base station 110-1 and/or from second base station 115-1. In some examples, the signal strengths may be measured by FWA device 105, first base station-1 110, and/or second base station 115-1. The signal strength information may be stored in signal strength data store 125 by FWA device 105, first base station 110-1, and/or second base station 115-1.

Attenuation value data store 130 may include a database or the like in a data structure, e.g., a table, and/or a linked list or the like, that stores attenuation information regarding attenuation values associated with signal strengths of signals received by FWA device 105. An attenuation value may refer to a value by which a signal strength is increased or decreased due an obstructing structure (e.g., a wall).

Attenuation value data store 130 may store attenuation information associated with different geographic addresses. A geographic address may include geographical coordinates, a zip code, a street number, and/or a street name, among other examples. As an example, attenuation value data store 130 may store first attenuation information regarding a first geographic address, second attenuation information regarding a second geographic address, and so on. For instance, FWA device 105 may be located at a customer premises and the first attenuation information may be associated with an address of the customer premises (e.g., geographical coordinates of the customer premises, a zip code of the customer premises, a street number of the customer premises, and/or a street name of the customer premises, among other examples).

In some implementations, the first attenuation information may include one or more attenuation values associated with one or more frequency bands. For example, the first attenuation information may include a first attenuation value associated with a first frequency band, a second attenuation value associated with a second frequency band, and so on. In some examples, personnel of a service provider (associated with FWA device 105) may determine the one or more attenuation values. For example, during installation of FWA device 105, the personnel may measure an amount of interference caused by obstructing structures (at the customer premises) to signals of different frequency bands. For instance, by way of measurements, the personnel may determine that the obstructing structures decrease a signal strength of signals of a first frequency band by a first attenuation value, determine that the obstructing structures decrease a signal strength of signals of a second frequency band by a second attenuation value, and so on. In some examples, the personnel may estimate the one or more attenuation values based on similar measurements obtained at a location within a distance threshold of the customer premises.

Figure 1B:
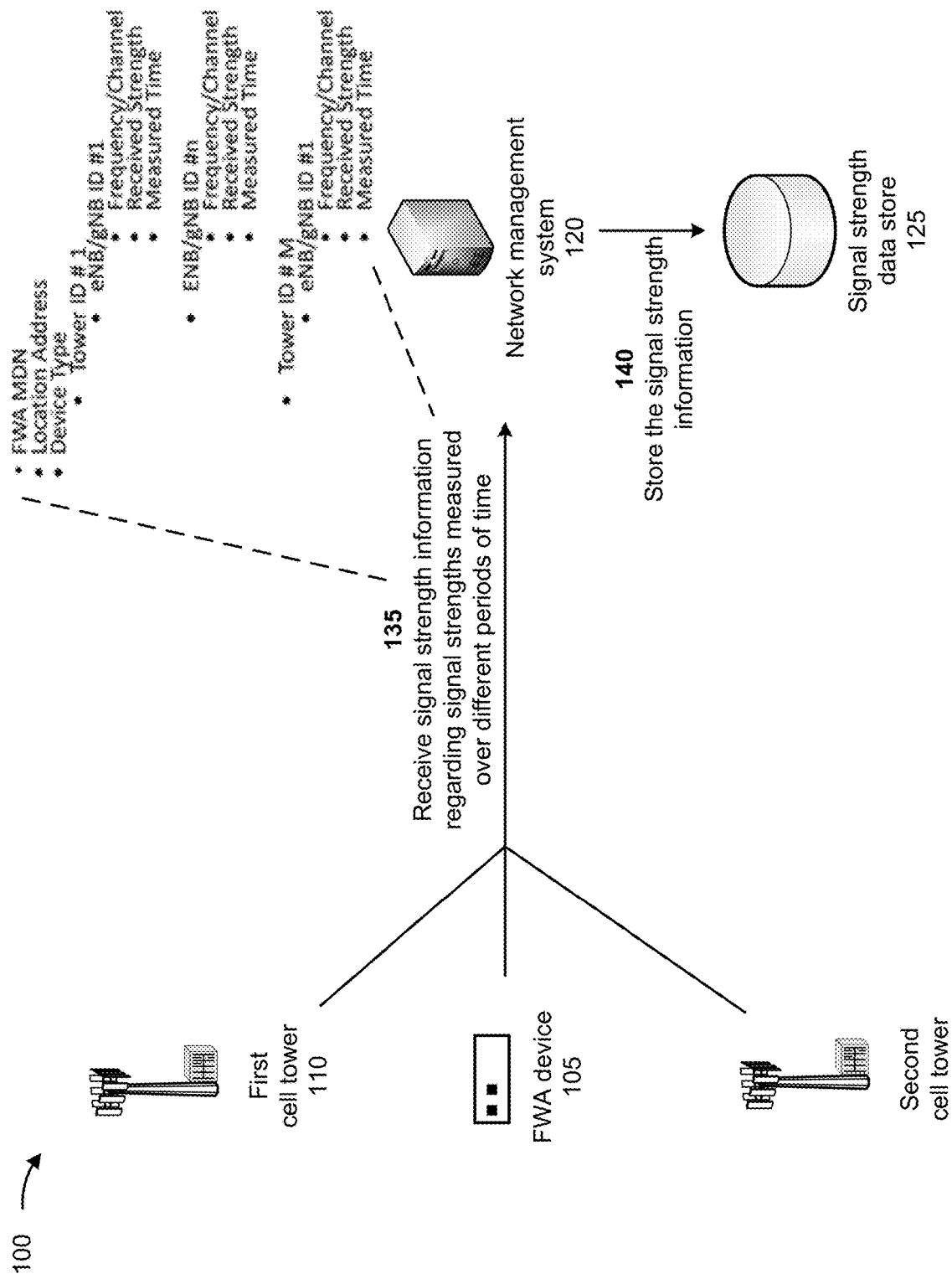

As shown in FIG. 1B, and by reference number 135, network management system 120 may receive signal strength information regarding signal strengths measured over different periods of time. For example, FWA device 105, first base station 110-1, and/or second base station 115-1 may measure the signal strengths and provide the signal strength information (regarding the measured signal strengths) to network management system 120. In some instances, when measuring a signal strength, FWA device 105, first base station 110-1, and/or second base station 115-1 may determine a reference signal received power (RSRP) measurement, a channel quality indicator (CQI) measurement, a signal to interference plus noise ratio (SINR) measurement, and/or a reference signal received quality (RSRQ) measurement.

In some implementations, network management system 120 may receive the signal strength information from FWA device 105. Additionally, or alternatively, network management system 120 may receive the signal strength information from first base station 110-1. Additionally, or alternatively, network management system 120 may receive the signal strength information from second base station 115-1. For example, FWA device 105 may report the signal strengths (of signals received from first base station 110) to first base station 110-1, and first base station 110-1 may report the signal strengths to network management system 120. Similarly, FWA device 105 may report the signal strengths (of signals received from second base station 115-1) to second base station 115-1 and second base station 115-1 may report the signal strengths to network management system 120. FWA device 105 may report the signal strengths (to first base station 110-1 and/or second base station 115-1) periodically (e.g., every millisecond, every 10 milliseconds, every 30 milliseconds, among other examples).

When reporting the signal strengths to network management system 120, first base station 110-1 may provide information identifying first cell tower 110, information identifying one or more sectors of first base station 110-1, information identifying one or more devices associated with the one or more sectors, and/or a signal strength of each device of the one or more devices. In some examples, information identifying a device may include a mobile directory number (MDN), a serial number of the device, and/or a network address associated with the device, among other examples.

In some implementations, network management system 120 may receive the signal strength information based on a trigger (e.g., based on a request from network management system 120). Additionally, or alternatively, network management system 120 may receive the signal strength information periodically (e.g., every millisecond, every 10 milliseconds, every 30 milliseconds, among other examples).

As shown in FIG. 1B, for example, the signal strength information may include information identifying FWA device 105, information identifying an address associated with FWA device 105, information identifying a frequency band (or a channel) of signals received by FWA device 105, information identifying a base station that transmitted the signals, information identifying a cell tower that includes the base station, information identifying signal strengths of the signals, and/or information identifying a time or a period of time during which the signal strengths were measured, among other examples.

The information identifying FWA device 105 may include a MDN of FWA device 105, a serial number of FWA device 105, and/or a network address associated with FWA device 105, among other examples. The information identifying the address associated with FWA device 105 may include information identifying the address of the customer premises (e.g., geographical coordinates, a zip code, a street number, and/or a street name, among other examples).

When receiving the signal strength information, network management system 120 may receive first signal strength information regarding signal strengths of signals received from first base station 110-1, receive second signal strength information regarding signal strengths of signal strengths received from second base station 115-1, and so on. As an example, the first signal strength information may include identifying a frequency band (or a channel) of signals received by FWA device 105 from first base station 110-1, information identifying first base station 110-1, information identifying signal strengths of the signals, and/or information identifying a time or a period of time during which the signal strengths were measured, among other examples.

As shown in FIG. 1B, and by reference number 140, network management system 120 may store the signal strength information. For example, network management system 120 may store the signal strength information in signal strength data store 125. In some implementations, network management system 120 may store a different entry for the signal strength information for each period of time of a plurality of periods. For example, network management system 120 may store (in a first entry) the signal strength information for signal strengths measured during a first period of time, store (in a second entry) the signal strength information for signal strengths measured during a second period of time, and so on. In some examples, when storing the different entry for the signal strength information for each period of time, network management system 120 may store a different entry for the first signal strength information for each period of time of a plurality of periods, store a different entry for the second signal strength information for each period of time of a plurality of periods, and so on.

In some examples, multiple signal strengths may be measured during a period of time. Accordingly, an entry, for the signal strength information of a particular period of time, may identify a minimum signal strength measured during the particular period of time, a maximum signal strength measured during the particular period of time, a median signal strength measured during the particular period of time, an average signal strength measured during the particular period of time.

Figure 1C:
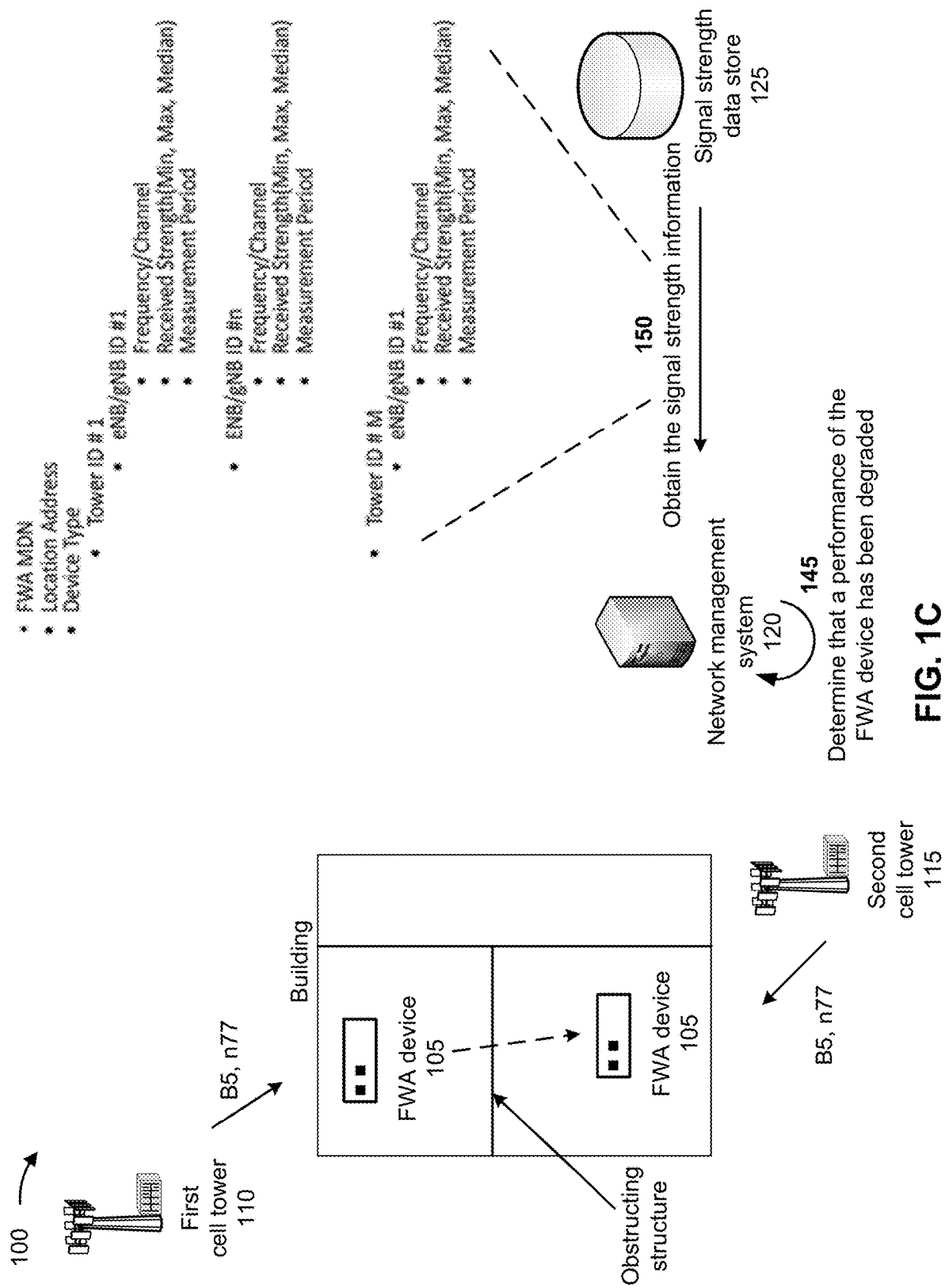

As shown in FIG. 1C, and by reference number 145, network management system 120 may determine that a performance of the FWA device has been degraded. For example, network management system 120 may receive a notification that the performance of FWA device 105 has been degraded. In some implementations, the notification may include information identifying FWA device 105, information identifying the address associated with FWA device 105, information indicating that a speed of the Internet service has been degraded, among other examples.

Network management system 120 may receive the notification from a device of a user associated with FWA device 105 and/or a device of the personnel of the service provider associated with FWA device 105, among other examples. In some examples, network management system 120 may receive the notification from the device of the personnel during a troubleshooting operation regarding a connection established by FWA device 105.

As shown in FIG. 1C, FWA device 105 may be relocated from a first location to a second location. The first location may be a first room of a building and the second location may be a second room of the building. The first room and the second room may be separated by an obstructing structure (e.g., a wall). As a result of FWA device 105 being relocated from the first room to the second room, a signal strength of signals received by FWA device 105 from first base station 110 may be decreased by the obstructing structure. Conversely, a signal strength of signals received by FWA device 105 from second base station 115 may be increased because the signals are no longer obstructed by the obstructing structure. In some examples, the signals received from first base station 110-1 may be included in a first frequency band while the signals received from second base station 115-1 may be included in a second frequency band. Alternatively, the signals received from first base station 110-1 and the signals received from second base station 115-1 may be included in a same frequency band. As shown in FIG. 1C, base stations of first cell tower 110 may transmit signals associated with different frequency bands. Similarly, base stations of second cell tower 115 may transmit signals associated with different frequency bands.

As a result of FWA device 105 being relocated from the first room to the second room, the performance of FWA device 105 may be degraded. For example, if first base station 110-1 is a primary base station associated with FWA device 105, the speed of the Internet service may be degraded because the signal strength (of the signals received from first base station 110-1) has been decreased due to the signals being obstructed by the obstructing structure.

As shown in FIG. 1C, and by reference number 150, network management system 120 may obtain the signal strength information. For example, based on receiving the notification, network management system 120 obtain the signal strength information from signal strength data store 125. In some implementations, network management system 120 obtain use the information identifying FWA device 105 to obtain the signal strength information for multiple periods of time (e.g., a current period of time and a prior period of time preceding the current period).

For example, using the information identifying FWA device 105, network management system 120 may obtain the first signal strength for the current period of time and for the prior period of time. Additionally, network management system 120 may obtain the second signal strength for the current period of time and for the prior period of time. In some examples, the first signal strength may refer to a median signal strength of signals received from first base station 110-1. Alternatively, the first signal strength may refer to an average signal strength of signals received from first base station 110-1.

In some examples, the second signal strength may refer to a median signal strength of signals received from second base station 115-1. Alternatively, the second signal strength may refer to an average signal strength of signals received from second base station 115-1.

As shown in FIG. 1C, and by reference number 155, network management system 120 may obtain attenuation information regarding one or more attenuation values for a geographic address associated with FWA device. For example, based on receiving the notification, network management system 120 may obtain the attenuation information using the geographic address associated with FWA device 105. The geographical address may a geographic address of the customer premises.

Network management system 120 may obtain the attenuation information from attenuation value data store 130. In some instances, the attenuation information may include a first attenuation value associated with a first frequency band, a second attenuation value associated with a second frequency band, and so on.

In some situations, attenuation value data store 130 may not store the attenuation information associated with the geographic address associated with FWA device 105. In such situations, network management system 120 may use one or more default attenuation values associated with one or more frequency bands. In some implementations, the one or more default attenuation values may be determined by the service provider. As an example, a default value may be 6 dB. Due to standard building code in a country and/or a region associated with FWA device 105, a standard estimated attenuation value for each frequency can be used in the event no actual measurement is available.

In some examples, one or more default attenuation values may be based on a material of the obstructing structure, a thickness of the obstructing structure, and a frequency of the signal. For example, an attenuation value for reinforced concrete (203 mm) may be between 31 dB and 63 dB depending on the frequency of the signal. An attenuation value for concrete (203 mm) may be between 29 dB and 54 dB depending on the frequency of the signal. An attenuation value for brick-faced concrete may be between 18 dB and 48 dB depending on the frequency of the signal. An attenuation value for masonry block may be between 11 dB and 16 dB depending on the frequency of the signal. An attenuation value for lumber (dry-38 mm) may be between 3 dB and 4 dB depending on the frequency of the signal. An attenuation value for drywall may be approximately 1 dB. An attenuation value for plywood (6 mm) may be approximately 1 dB.

Figure 1D:
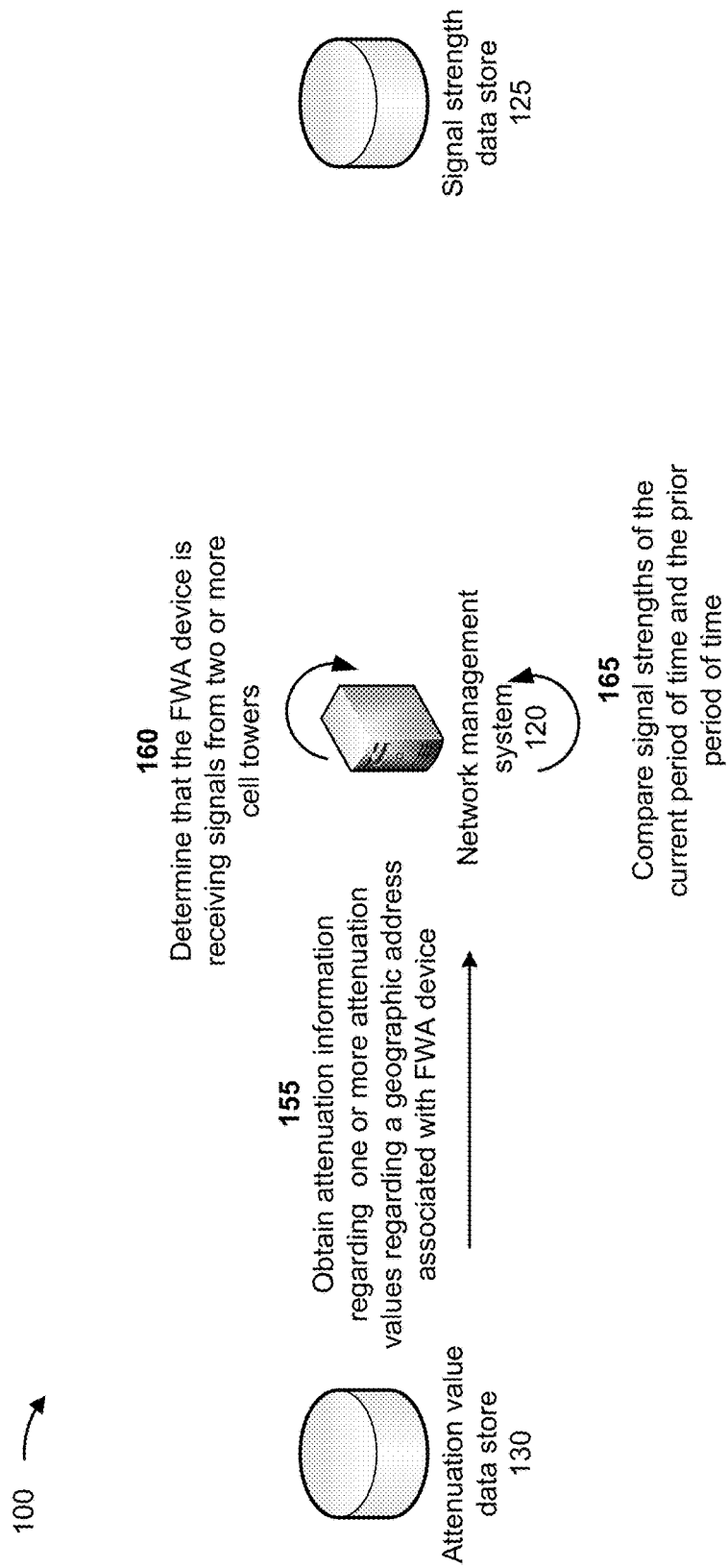

As shown in FIG. 1D, and by reference number 160, network management system 120 may determine that the FWA device is receiving signals from two or more cell towers. For example, based on obtaining the first signal strength information regarding signals received from first base station 110-1, network management system 120 may determine that FWA device 105 is receiving signals from first base station 110-1 (of first cell tower 110). Additionally, based on obtaining the second signal strength information regarding signals received from second base station 115-1 (of second cell tower 115), network management system 120 may determine that FWA device 105 is also receiving signals from second base station 115-1. Accordingly, network management system 120 may determine that FWA device 105 is receiving signals from multiple base stations of multiple cell towers.

As shown in FIG. 1D, and by reference number 165, network management system 120 may compare signal strengths of a current period of time and a prior period of time. For example, network management system 120 may compare the first signal strength for the current period of time and the first signal strength for the prior period of time to determine a change in the first signal strength from the prior period of time to the current period of time. Network management system 120 may compare the first signal strength for the current period of time and the first signal strength for the prior period of time based on determining that FWA device 105 is receiving signals from the two or more base stations.

Additionally, network management system 120 may compare the second signal strength for the current period of time and the second signal strength for the prior period of time to determine a change in the second signal strength from the prior period of time to the current period of time. Network management system 120 may compare the second signal strength for the current period of time and the second signal strength for the prior period of time based on determining that FWA device 105 is receiving signals from the two or more base stations.

Figure 1E:
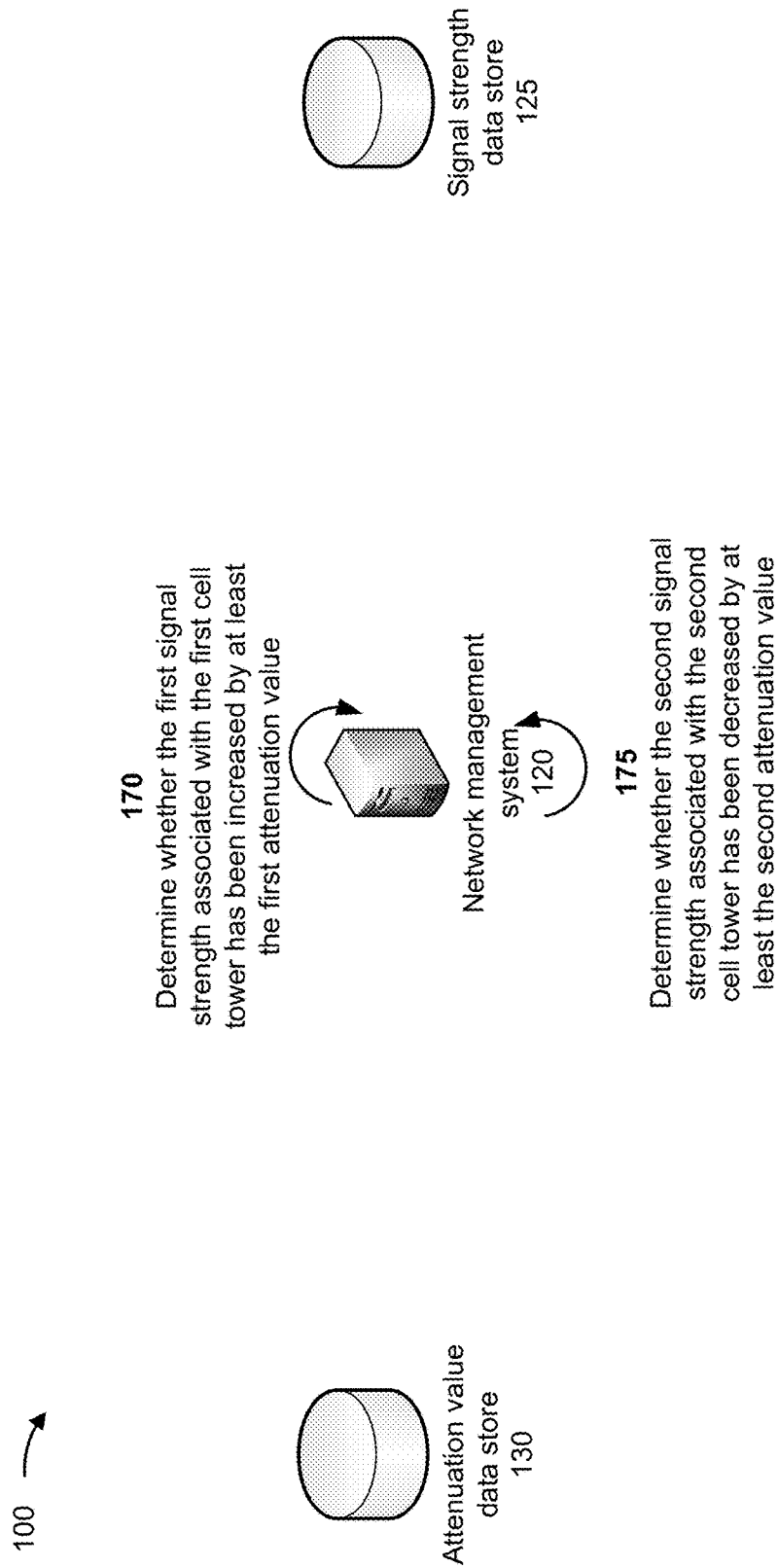

As shown in FIG. 1E, and by reference number 170, network management system 120 may determine whether the first signal strength associated with the first cell tower has increased by at least the first attenuation value. For example, based on comparing the first signal strength for the current period of time and the first signal strength for the prior period of time, network management system 120 may determine whether the first signal strength has increased by a value that is equal to or exceeds the first attenuation value. Alternatively, network management system 120 may determine whether the first signal strength has decreased by a value that is equal to or exceeds the first attenuation value.

Network management system 120 may use the first attenuation value based on determining that the signals, received from first base station 110-1, are associated with the first frequency band. Network management system 120 may determine that the signals, received from first base station 110-1, are associated with the first frequency band based on the first signal strength information including information identifying the first frequency band.

As shown in FIG. 1E, and by reference number 175, network management system 120 may determine whether the second signal strength associated with the second cell tower has decreased by at least the second attenuation value. For example, based on comparing the second signal strength for the current period of time and the second signal strength for the prior period of time, network management system 120 may determine whether the second signal strength has decreased by a value that corresponds to or exceeds the second attenuation value. Alternatively, network management system 120 may determine whether the second signal strength has increased by a value that corresponds to or exceeds the second attenuation value.

Network management system 120 may use the second attenuation value based on determining that the signals, received from second base station 115-1, are associated with the second frequency band. Network management system 120 may determine that the signals, received from second base station 115-1, are associated with the second frequency band based on the second signal strength information including information identifying the second frequency band.

Figure 1F:
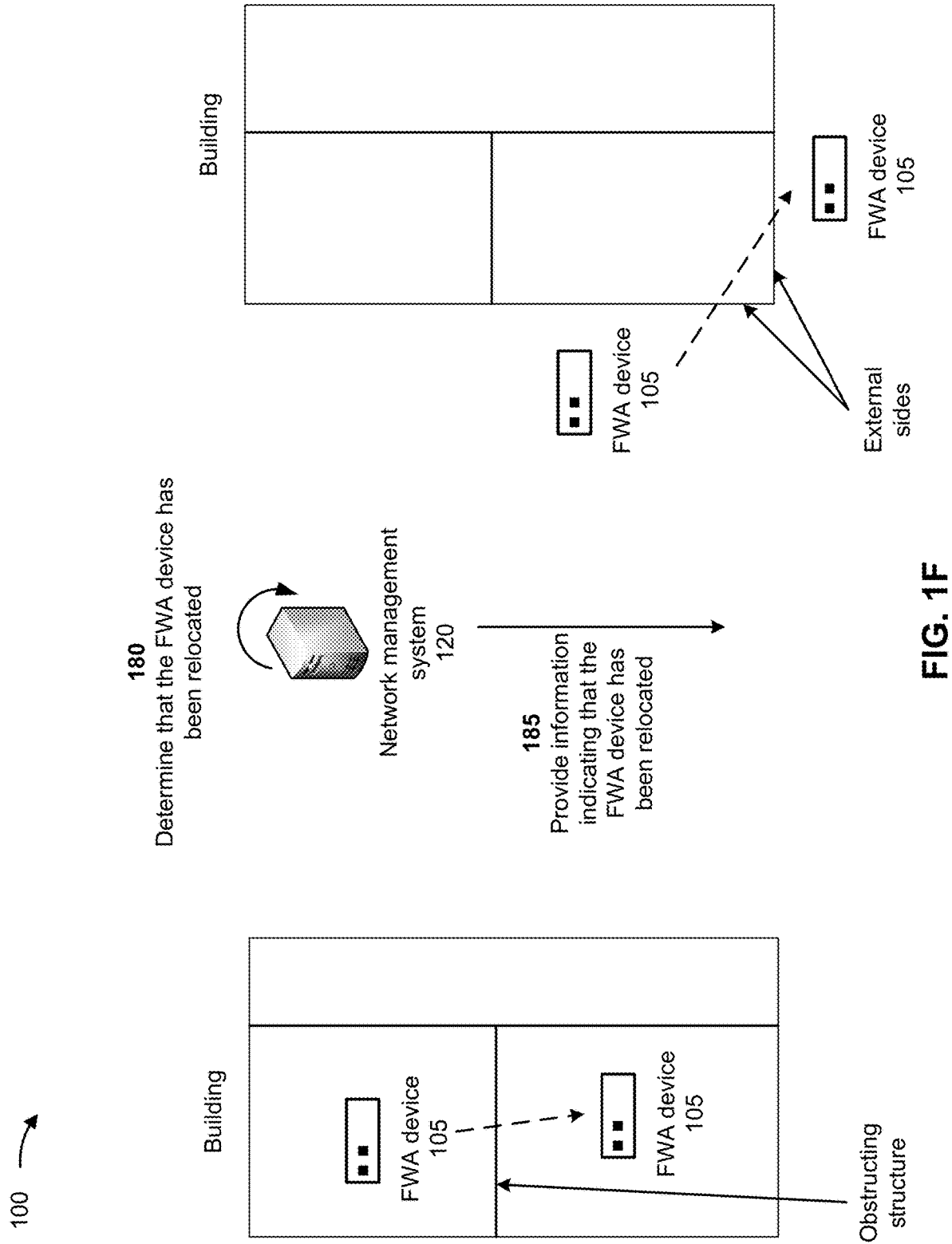

As shown in FIG. 1F, and by reference number 180, network management system 120 may determine that the FWA device has been relocated. For example, network management system 120 may determine that FWA device 105 has been relocated based on determining that the first signal strength has decreased by a value that is equal to or exceeds the first attenuation value and that the second signal strength has increased by a value that is equal to or exceeds the second attenuation value. Referring back to the example relocation described in connection with FIG. 1C, as a result of FWA device 105 being relocated from the first room to the second room, the first signal strength (of signals received by FWA device 105 from first base station 110-1) may be decreased by the obstructing structure.

Accordingly, the first signal strength may be decreased by a value that is equal to or exceeds the first attenuation value. Conversely, a signal strength of signals received by FWA device 105 from second base station 115-1 may be increased because the signals are no longer obstructed by the obstructing structure. Accordingly, the second signal strength may be increased by a value that is equal to or exceeds the second attenuation value.

In some examples, network management system 120 may determine that FWA device 105 has been relocated based on determining that the first signal strength has increased by a value that is equal to or exceeds the first attenuation value and that the second signal strength has decreased by a value that is equal to or exceeds the second attenuation value. In some situations, FWA device 105 may be relocated from a first external side of a structure to a second external side of the structure, as shown in FIG. 1F. The structure may be an enclosed structure, such as a building, a home, a warehouse, among other examples. Network management system 120 may determine that FWA device 105 has been relocated from the first external side to the second external side in a manner similar to the manner described herein.

As shown in FIG. 1F, and by reference number 185, network management system 120 may provide information indicating that the FWA device has been relocated. For example, network management system 120 provide the information to the device of the user associated with FWA device 105 and/or to the device of the personnel of the service provider associated with FWA device 105. In some implementations, the information may include an instruction to relocate FWA device 105 to a previous location of FWA device 105 (e.g., a location prior to the performance being degraded). In the examples described herein, the previous location may be the first room or the first external side.

Figure 1G:
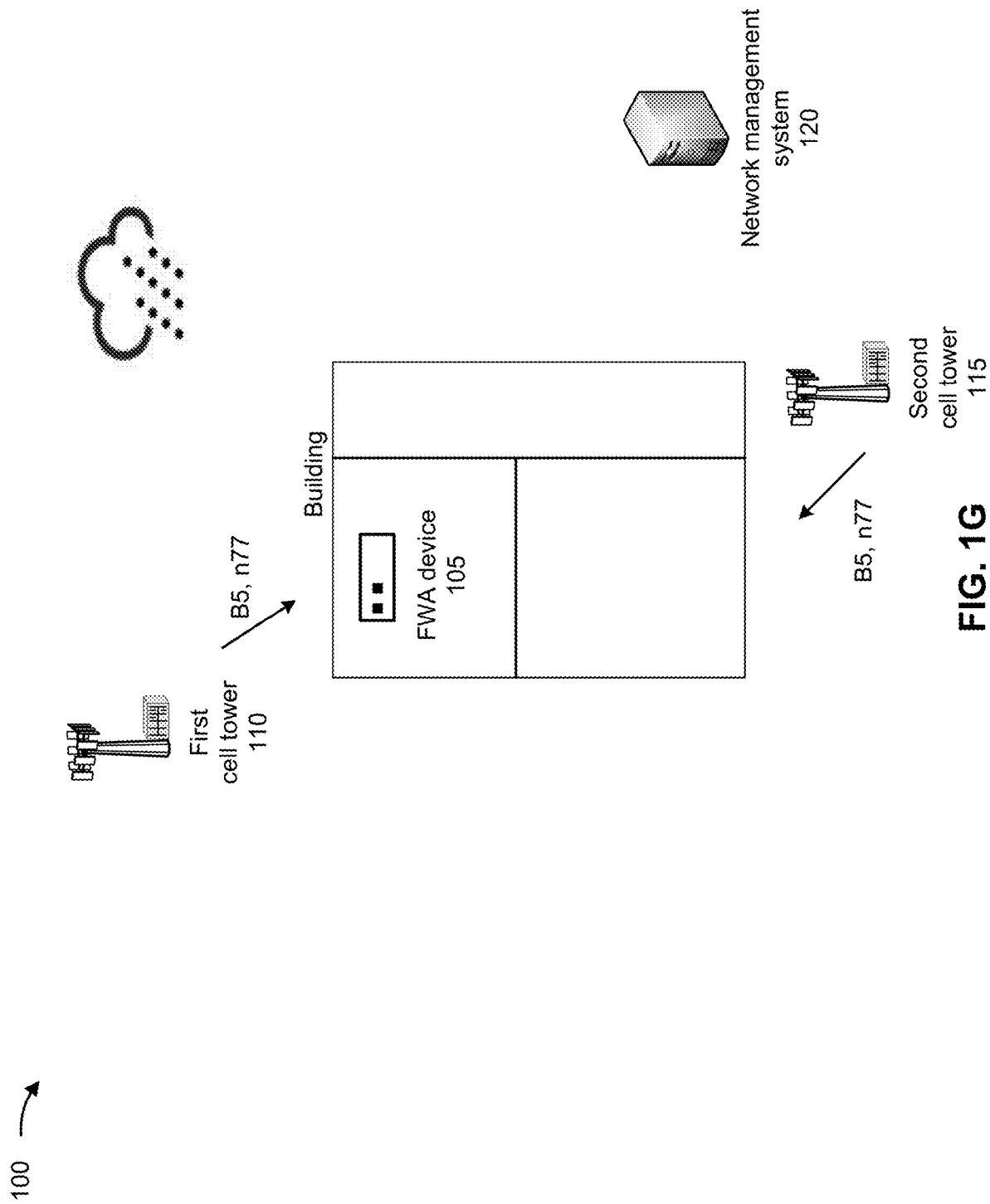

As shown in FIG. 1G, the signals (received by FWA device 105 from first cell tower 110 and from second cell tower 115) may be subject to unfavorable weather conditions (e.g., rain, snow, among other examples). The unfavorable weather conditions cause the first signal strength and the second signal strength to be degraded. Unlike instances during which the first signal strength is decreased and the second signal strength is decreased due to relocation of FWA device 105, the unfavorable weather conditions cause the first signal strength and the second signal strength to be decreased by a same value. Accordingly, network management system 120 may distinguish between the performance of FWA device 105 being degraded due to the FWA device being relocated and the performance of FWA device 105 being degraded due to the unfavorable weather conditions.

By determining that FWA device 105 being relocated is a cause of the degraded performance of FWA device 105, network management system 120 may prevent time-consuming troubleshooting, as described above. Accordingly, by determining that FWA device 105 being relocated is the cause of the degraded performance, network management system 120 may prevent FWA device 105 from rebooting and/or performing the re-configuration, as described above. Therefore, implementations described herein preserve network resources and/or computing resources that would have been consumed by troubleshooting the connection, as described above.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
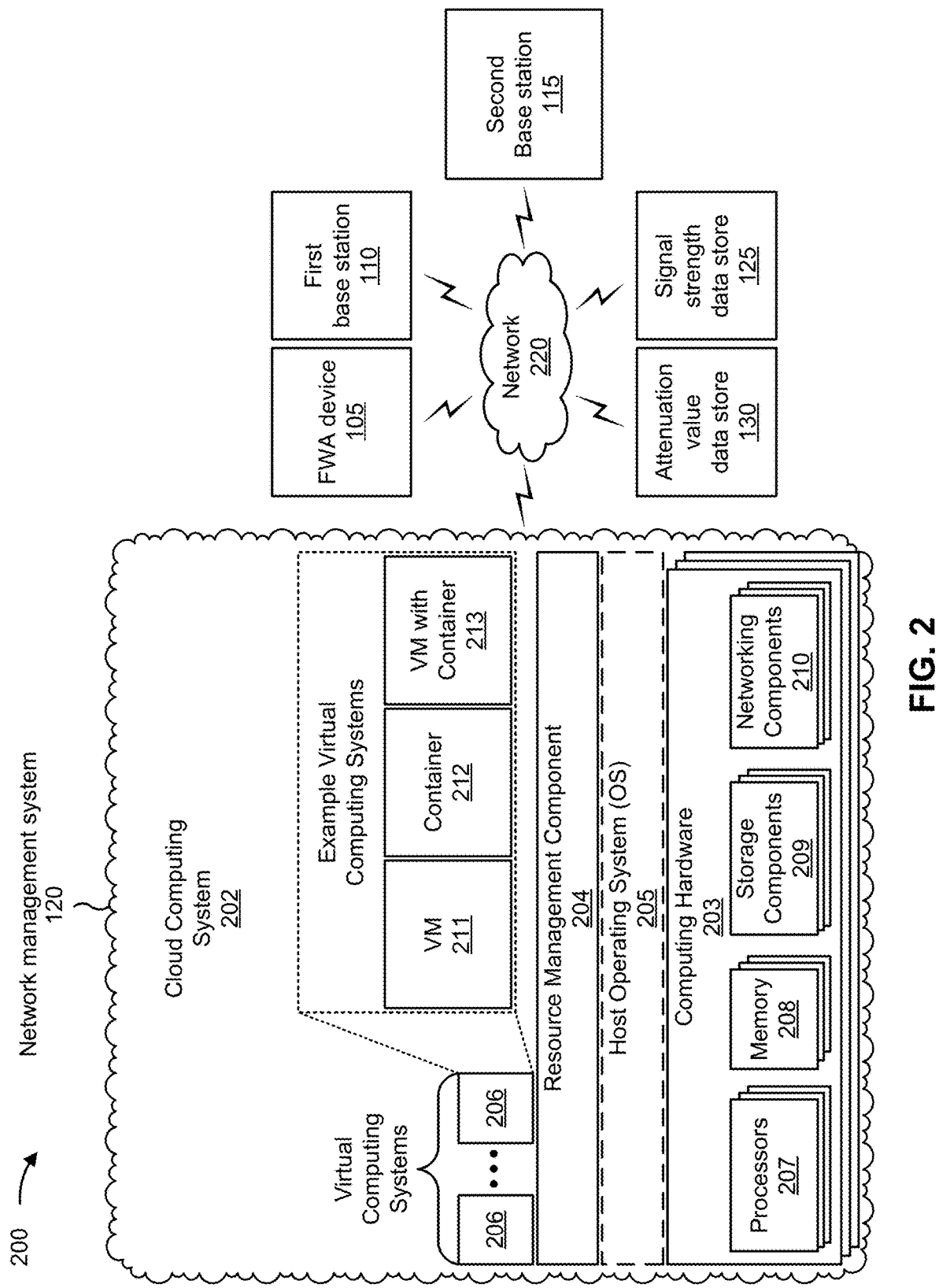
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include network management system 120, which may include one or more elements of and/or may execute within a cloud computing system 202. The cloud computing system 202 may include one or more elements 203-213, as described in more detail below. As further shown in FIG. 2, environment 200 may include FWA device 105, first base station 110, second base station 115, signal strength data store 125, attenuation value data store 130, and/or network 220. FWA device 105, first base station 110, second base station 115, signal strength data store 125, and attenuation value data store 130 have been described above in connection with FIG. 1. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although network management system 120 may include one or more elements 203-213 of the cloud computing system 202, may execute within the cloud computing system 202, and/or may be hosted within the cloud computing system 202, in some implementations, network management system 120 may not be cloud-based (e.g., may be implemented outside of a cloud computing system) or may be partially cloud-based. For example, network management system 120 may include one or more devices that are not part of the cloud computing system 202, such as device 300 of FIG. 3, which may include a standalone server or another type of computing device. Network management system 120 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
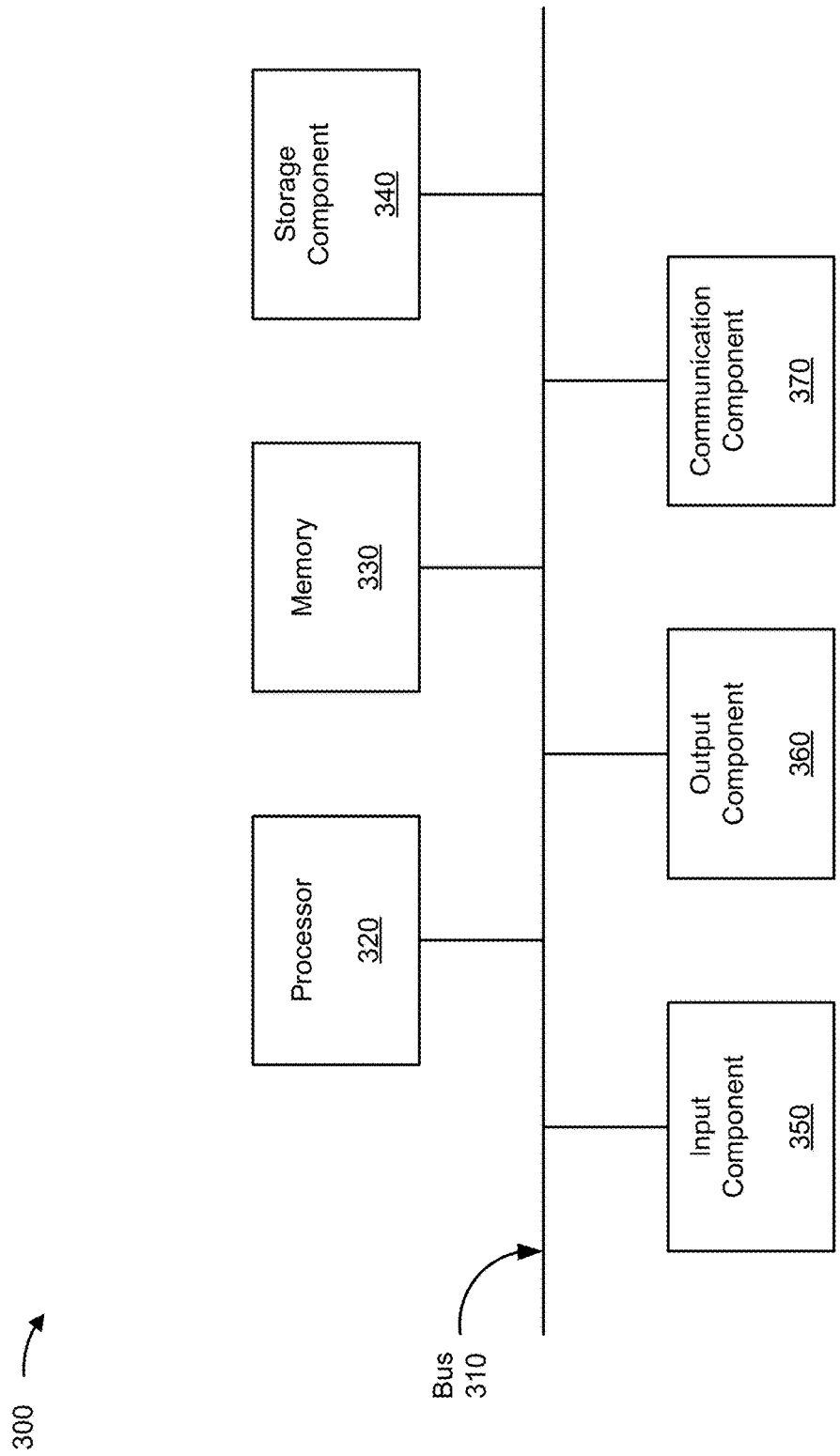
FIG. 3 is a diagram of example components of one or more devices of FIG. 2.

FIG. 3 is a diagram of example components of a device 300, which may correspond to FWA device 105, first base station 110, second base station 115, and/or network management system 120. In some implementations, FWA device 105, first base station 110, second base station 115, and/or network management system 120 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 relating to detecting a relocation of a fixed wireless access device. In some implementations, one or more process blocks of FIG. 4 may be performed by a network management system (e.g., network management system 120). In some implementations, one or more process blocks of FIG. 4 may be performed by another device or a group of devices separate from or including the network management system, such as an FWA device (e.g., FWA device 105), first base station 110 (e.g., first base station 110), and/or second base station 115 (e.g., second base station 115). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include determining whether a fixed wireless access device receives signals from multiple cell towers (block 410). For example, the network management system may determine whether a fixed wireless access device receives signals from multiple cell towers, as described above. For instance, the network management system may determine whether the fixed wireless access device receives signals from multiple base stations of multiple cell towers.

As shown in FIG. 4, process 400 may include determining a first change in a first signal strength associated with first signals received by the fixed wireless access device located a first location (block 420). For example, the network management system may determine a first change in a first signal strength associated with first signals received by the fixed wireless access device located a first location, as described above. The first signals are received by the fixed wireless access device from a first base station (e.g., of a first cell tower).

As further shown in FIG. 4, process 400 may include determining a second change in a second signal strength associated with second signals received by the fixed wireless access device (block 430). For example, the network management system may determine a second change in a second signal strength associated with second signals received by the fixed wireless access device, as described above. The second signals are received by the fixed wireless access device from a second base station (e.g., of a second cell tower).

As further shown in FIG. 4, process 400 may include determining, based on the first change, whether the first signal strength has increased by more than a first attenuation value (block 440). For example, the network management system may determine, based on the first change, whether the first signal strength has increased by more than a first attenuation value, as described above.

In some implementations, process 400 includes obtaining, from a data store, the first attenuation value and the second attenuation value, wherein the first attenuation value and the second attenuation value are obtained using information identifying an address associated with the first location.

As further shown in FIG. 4, process 400 may include determining, based on the second change, whether the second signal strength has decreased by more than a second attenuation value (block 450). For example, the network management system may determine, based on the second change, whether the second signal strength has decreased by more than a second attenuation value, as described above.

In some implementations, the first signals are associated with a first frequency band, the first attenuation value indicates a first measure of signal attenuation caused by an obstructing structure to signals associated with the first frequency band, the second signals are associated with a second frequency band, and the second attenuation value indicates a second measure of signal attenuation caused by the obstructing structure to signals associated with the second frequency band.

As further shown in FIG. 4, process 400 may include determining that the fixed wireless access device has been relocated to a second location (block 460). For example, the network management system may determine that the fixed wireless access device has been relocated to a second location based on the first signal strength increasing by more than the first attenuation value and the second signal strength decreasing by more than the second attenuation value, as described above.

In some implementations, determining that the fixed wireless access device has been relocated comprises determining that the fixed wireless access device has been relocated from a first room of a structure to a second room of the structure.

In some implementations, process 400 includes providing information indicating that the fixed wireless access device has been relocated from the first location to the second location.

In some implementations, determining the first change comprises comparing a first portion of the first signals and a second portion of the first signals, wherein the first portion of the first signals is received by the fixed wireless access device during a first period of time, and wherein the second portion of the first signals is received by the fixed wireless access device during a second period of time, and determining the first change based on comparing the first portion of the first signals and the second portion of the first signals.

In some implementations, comparing the first portion of the first signals and the second portion of the first signals comprises comparing a first median of the first portion of the first signals and a second median of the second portion of the first signals, or comparing a first average of the first portion of the first signals and a second average of the second portion of the first signals.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a network management system, the method comprising:
    determining a first change in a first signal strength associated with first signals received by a fixed wireless access device located at a first location of a structure, wherein the first signals are received by the fixed wireless access device from a first base station of a first cell tower;
    determining a second change in a second signal strength associated with second signals received by the fixed wireless access device, wherein the second signals are received by the fixed wireless access device from a second base station of a second cell tower, and
        wherein the fixed wireless access device establishes a connection with the first base station or the second base station to provide Internet access to devices connected to the fixed wireless access device;
    determining, based on the first change, that the first signal strength has increased by more than a first attenuation value;
    determining, based on the second change, that the second signal strength has decreased by more than a second attenuation value; and determining that the fixed wireless access device has been relocated to a second location of the structure based on the first signal strength increasing by more than the first attenuation value and the second signal strength decreasing by more than the second attenuation value.

2. The method of claim 1, further comprising:
providing information indicating that the fixed wireless access device has been relocated from the first location to the second location.

3. The method of claim 1, wherein the first signals are associated with a first frequency band,
wherein the first attenuation value indicates a first measure of signal attenuation caused by an obstructing structure to signals associated with the first frequency band,
wherein the second signals are associated with a second frequency band, and
wherein the second attenuation value indicates a second measure of signal attenuation caused by the obstructing structure to signals associated with the second frequency band.

4. The method of claim 3, further comprising:
obtaining, from a data store, the first attenuation value and the second attenuation value,
wherein the first attenuation value and the second attenuation value are obtained using information identifying an address associated with the first location.

5. The method of claim 1, wherein determining the first change comprises:
comparing a first portion of the first signals and a second portion of the first signals,
wherein the first portion of the first signals is received by the fixed wireless access device during a first period of time, and
wherein the second portion of the first signals is received by the fixed wireless access device during a second period of time; and
determining the first change based on comparing the first portion of the first signals and the second portion of the first signals.

6. The method of claim 5, wherein comparing the first portion of the first signals and the second portion of the first signals comprises:
comparing a first median of the first portion of the first signals and a second median of the second portion of the first signals; or
comparing a first average of the first portion of the first signals and a second average of the second portion of the first signals.

7. The method of claim 1, wherein determining that the fixed wireless access device has been relocated comprises:
determining that the fixed wireless access device has been relocated from a first room of the structure to a second room of the structure,
wherein the first location includes the first room and the second location include the second room.

8. A device, comprising:
one or more processors configured to:
obtain a first attenuation value and a second attenuation value based on information identifying a geographic address associated with a fixed wireless access device;
determine a first change in a first signal strength associated with first signals received by the fixed wireless access device, wherein the first signals are received by the fixed wireless access device from a first base station, and wherein the first change indicates whether the first signal strength has increased by the first attenuation value;
determine a second change in a second signal strength associated with second signals received by the fixed wireless access device, wherein the second signals are received by the fixed wireless access device from a second base station, wherein the fixed wireless access device establishes a connection with the first base station or the second base station to provide Internet access to devices connected to the fixed wireless access device, and wherein the second change indicates whether the second signal strength has decreased by the second attenuation value; and
determine that the fixed wireless access device has been relocated from a first location of a structure to a second location of the structure based on the first signal strength increasing by the first attenuation value and the second signal strength decreasing by the second attenuation value.

9. The device of claim 8, wherein the first attenuation value indicates a first measure of signal attenuation caused by an obstructing portion, of the structure, to signals associated with a first frequency band,
wherein the first signals are associated with the first frequency band,
wherein the second attenuation value indicates a second measure of signal attenuation caused by the obstructing structure to signals associated with a second frequency band, and
wherein the second signals are associated with the second frequency band.

10. The device of claim 9, wherein the first frequency band is a frequency band that is same as the second frequency band, and
wherein the first attenuation value is an attenuation value that is same as the second attenuation value.

11. The device of claim 8, wherein the one or more processors, to determine the first change, are configured to:
determine a first median of a first portion of the first signals,
wherein the first portion of the first signals is received by the fixed wireless access device during a first period of time;
determine a second median of a second portion of the first signals,
wherein the second portion of the first signals is received by the fixed wireless access device during a second period of time; and
compare the first median and the second median to determine the first change.

12. The device of claim 8, wherein the one or more processors, to determine that the fixed wireless access device has been relocated, are configured to:
determine that the fixed wireless access device has been relocated from a first room of the structure to a second room of the structure, wherein the first location includes the first room and the second location includes the second room; or
determine that the fixed wireless access device has been relocated from a first external side of the structure to a second external side of the structure, wherein the first location includes the first external side and the second location includes the second external side.

13. The device of claim 8, wherein the one or more processors are configured to:

provide information indicating that a performance of the fixed wireless access device has been degraded based on determining that the fixed wireless access device has been relocated.

14. The device of claim 8, wherein the one or more processors are configured to:
    determine that the fixed wireless access device receives signals from multiple base stations; and
    determine the first change based on determining that the fixed wireless access device receives the signals from the multiple base stations.

15. A non-transitory computer-readable medium storing a set of instructions, the set of instructions comprising:
    one or more instructions that, when executed by one or more processors of a device, cause the device to:
        determine a first change in a first signal strength associated with first signals received by a fixed wireless access device, wherein the first signals are received by the fixed wireless access device from a first base station, and wherein the first change indicates whether the first signal strength has increased by a first attenuation value;
        determine a second change in a second signal strength associated with second signals received by the fixed wireless access device, wherein the second signals are received by the fixed wireless access device from a second base station, wherein the fixed wireless access device establishes a connection with the first base station or the second base station to provide Internet access to devices connected to the fixed wireless access device, and wherein the second change indicates whether the second signal strength has decreased by a second attenuation value; and
        determine whether the fixed wireless access device has been relocated from a first location of a structure to a second location of the structure based on whether the first signal strength has increased by the first attenuation value and whether the second signal strength has decreased by the second attenuation value.

16. The non-transitory computer-readable medium of claim 15, wherein the one or more instructions, when executed by the one or more processors, further cause the device to:
    obtain the first attenuation value and the second attenuation value, from a data store, based on information identifying a geographic address associated with the fixed wireless access device.

17. The non-transitory computer-readable medium of claim 15, wherein the first signals are associated with a first frequency band,
    wherein the first attenuation value indicates a first measure of signal attenuation caused by an obstructing structure to the first signals,
    wherein the second signals are associated with a second frequency band, and
    wherein the second attenuation value indicates a second measure of signal attenuation caused by the obstructing structure to the second signals.

18. The non-transitory computer-readable medium of claim 15, wherein the one or more instructions, that cause the device to determine that the fixed wireless access device has been relocated, cause the device to:
    determine that the fixed wireless access device has been relocated from a first room of the structure to a second room of the structure, wherein the first location includes the first room and the second location includes the second room.

19. The non-transitory computer-readable medium of claim 15, wherein the one or more instructions, that cause the device to determine that the fixed wireless access device has been relocated, cause the device to:
    determine that the fixed wireless access device has been relocated from a first external side of the structure to a second external side of the structure, wherein the first location includes the first external side and the second external side includes the second room.

20. The non-transitory computer-readable medium of claim 15, wherein the one or more instructions, that cause the device to determine the first change, cause the device to:
    determine that the fixed wireless access device receives signals from multiple base stations of multiple cell towers; and
    determine the first change based on determining that the fixed wireless access device receives signals from multiple base stations of multiple cell towers.

* * * * *